United States Patent
Tsubosaka (10) Patent No.: US 11,258,086 B2
(45) Date of Patent: Feb. 22, 2022

(54) METHOD OF MANUFACTURING MEMBRANE ELECTRODE ASSEMBLY AND MEMBRANE ELECTRODE ASSEMBLY

(71) Applicant: TOYOTA JIDOSHA KABUSHIKI KAISHA, Toyota (JP)

(72) Inventor: Kenji Tsubosaka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/997,104

(22) Filed: Aug. 19, 2020

(65) Prior Publication Data

US 2021/0167409 A1 Jun. 3, 2021

(30) Foreign Application Priority Data

Dec. 3, 2019 (JP) .............................. JP2019-218490

(51) Int. Cl.
*H01M 8/10* (2016.01)
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8807* (2013.01); *H01M 4/8878* (2013.01)

(58) Field of Classification Search
CPC ............. H01M 8/1069; H01M 8/1004; H01M 8/1007; H01M 8/1046; H01M 8/1048; H01M 4/8807; H01M 4/881; H01M 4/8878; H01M 4/8882
See application file for complete search history.

(56) References Cited

U.S. PATENT DOCUMENTS

| 2010/0216048 A1* | 8/2010 | Braeuninger ....... H01M 8/1088 429/483 |
| 2016/0104896 A1 | 4/2016 | Nishida et al. |
| 2016/0104909 A1* | 4/2016 | Kawasumi .......... H01M 8/1004 429/535 |
| 2016/0133946 A1 | 5/2016 | Tsubosaka et al. |
| 2017/0271699 A1* | 9/2017 | Yokoi ....................... B32B 5/16 |

FOREIGN PATENT DOCUMENTS

| JP | 2016081624 A | 5/2016 |
| JP | 2016091874 A | 5/2016 |
| JP | 2018195543 A | 12/2018 |

* cited by examiner

*Primary Examiner* — Raymond Alejandro
(74) *Attorney, Agent, or Firm* — Dickinson Wright, PLLC (57) ABSTRACT

A method of manufacturing a membrane electrode assembly, includes: forming catalyst coated membrane using an electrode catalyst layer containing an ionomer having a sulfonic acid group and a catalyst carrier, and an electrolyte membrane; applying an ionization accelerator having a low molecular weight component represented by a chemical formula $C_lH_mO_n$ (where l, m, and n are natural numbers) for accelerating generation of sulfate ions, to the catalyst coated membrane; performing UV irradiation on the ionization accelerator applied to the catalyst coated membrane; heating the catalyst coated membrane having the ionization accelerator subjected to the UV irradiation; and bonding a gas diffusion layer containing a radical inhibiting substance to an outer surface of at least one of the ionization accelerator subjected to the UV irradiation or the catalyst coated membrane.

4 Claims, 6 Drawing Sheets

METHOD OF MANUFACTURING MEMBRANE ELECTRODE ASSEMBLY AND MEMBRANE ELECTRODE ASSEMBLY

CROSS-REFERENCE TO RELATED APPLICATION

This application claims priority to Japanese Patent Application No. 2019-218490 filed on Dec. 3, 2019, incorporated herein by reference in its entirety.

BACKGROUND

1. Technical Field

The present disclosure relates to a method of manufacturing a membrane electrode assembly and a membrane electrode assembly.

2. Description of Related Art

In a method of manufacturing a membrane electrode assembly, there is known a technique for suppressing the deterioration of an electrode catalyst layer due to excessive sulfate ions by selecting and using an electrode catalyst layer in which the amount of sulfate ions is equal to or less than a predetermined default value (for example, Japanese Unexamined Patent Application Publication No. 2016-091874).

SUMMARY

When the amount of sulfate ions is excessively suppressed, hydrogen peroxide generated during power generation of a fuel cell cannot be sufficiently rendered harmless, and the performance of an electrolyte membrane may decrease.

The present disclosure can be realized as the following aspect.

(1) An aspect of the present disclosure relates to a method of manufacturing a membrane electrode assembly, including: forming a catalyst coated membrane using an electrode catalyst layer containing an ionomer having a sulfonic acid group and a catalyst carrier, and an electrolyte membrane; applying an ionization accelerator having a low molecular weight component represented by a chemical formula $C_lH_mO_n$ (where l, m, and n are natural numbers) for accelerating generation of sulfate ions, to the catalyst coated membrane; performing UV irradiation on the ionization accelerator applied to the catalyst coated membrane; heating the catalyst coated membrane having the ionization accelerator subjected to the UV irradiation; and bonding a gas diffusion layer containing a radical inhibiting substance to an outer surface of at least one of the ionization accelerator subjected to the UV irradiation or the catalyst coated membrane. According to the method of manufacturing a membrane electrode assembly of this aspect, since the ionization accelerator containing the low molecular weight component represented by the chemical formula $C_lH_mO_n$ is applied to the catalyst coated membrane, the sulfonic acid group of the ionomer contained in the electrode catalyst layer can be decomposed to increase the amount of sulfate ions. Therefore, ionization of the radical inhibiting substance contained in the gas diffusion layer can be accelerated. Therefore, inactivation of radicals in the electrolyte membrane and inhibition of generation of radicals can be accelerated, and deterioration of the electrolyte membrane due to the radicals can be suppressed.

(2) In the method of manufacturing a membrane electrode assembly according to the above aspect, the ionization accelerator may be contained in an adhesive for bonding the membrane electrode assembly to a frame body. According to the method of manufacturing a membrane electrode assembly of this aspect, the adhesive for bonding the membrane electrode assembly to the frame body is used as the ionization accelerator. It is not necessary to individually apply solely the ionization accelerator to the catalyst coated membrane, a step can be omitted, so that productivity of the membrane electrode assembly can be improved.

(3) In the method of manufacturing a membrane electrode assembly according to the above aspect, an amount of the sulfate ions contained in the catalyst coated membrane may be 0.0128 $\mu g/cm^2$ or more. According to the method of manufacturing a membrane electrode assembly of this aspect, the ionization of the radical inhibiting substance can be accelerated to sufficiently suppress the deterioration of the electrolyte membrane.

(4) In the method of manufacturing a membrane electrode assembly according to the above aspect, a temperature for the heating may be a temperature higher than a glass transition point of the ionomer. According to the method of manufacturing a membrane electrode assembly of this aspect, since the temperature for heating and drying the ionization accelerator is set to a temperature higher than the glass transition point of the ionomer in the electrode catalyst layer, it is possible to further accelerate the decomposition of the sulfonic acid group of the ionomer by the ionization accelerator.

The present disclosure can be realized in various forms other than the method of manufacturing a membrane electrode assembly. For example, the present disclosure can be realized in the form of a membrane electrode assembly, a fuel cell including a membrane electrode assembly, a method of manufacturing a membrane electrode assembly and a fuel cell including the membrane electrode assembly, a control method of an apparatus for manufacturing a membrane electrode assembly and a fuel cell including the membrane electrode assembly, a computer program for realizing the control method, a non-transitory recording medium having the computer program recorded thereon, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
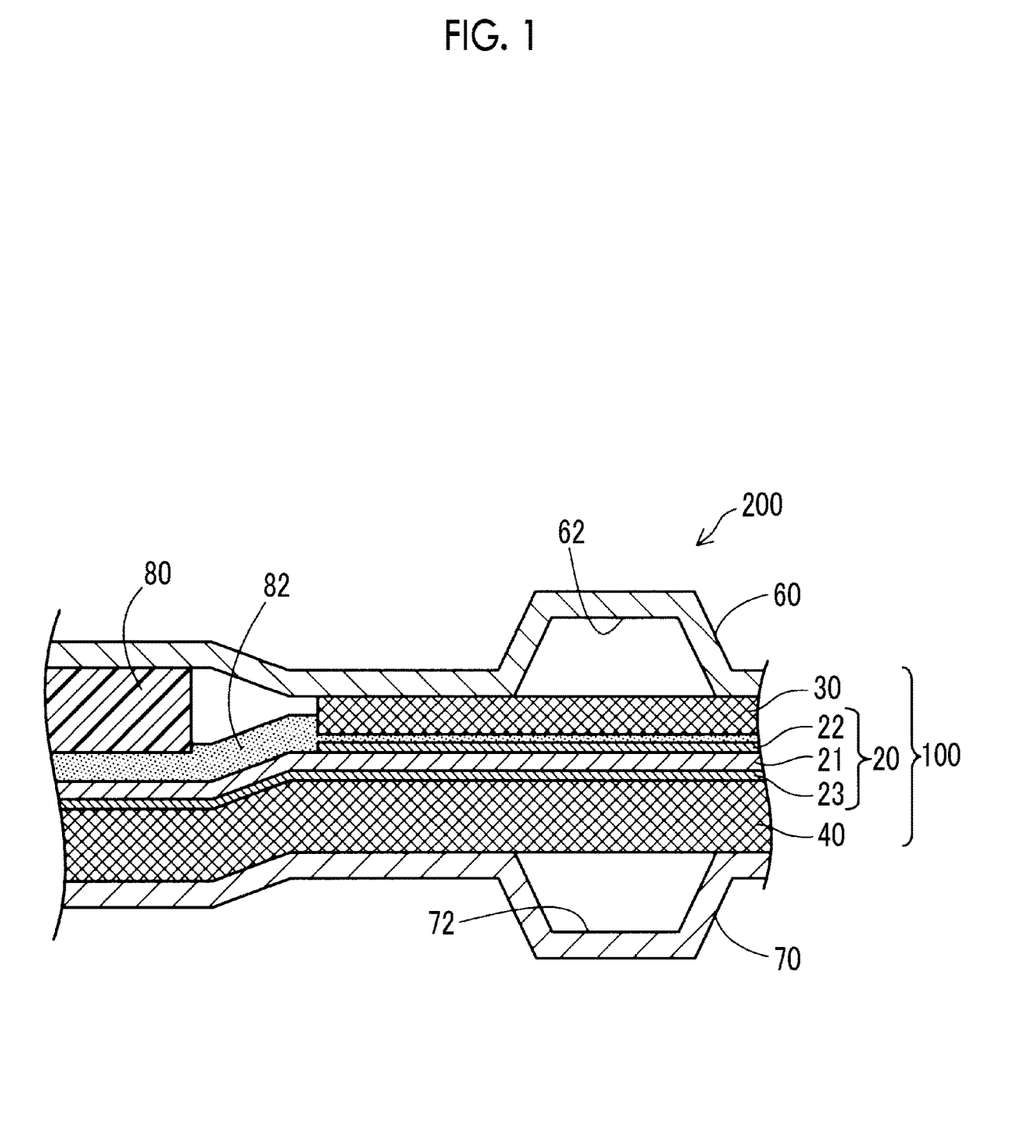
FIG. 1 is a sectional view schematically illustrating a fuel cell including a membrane electrode assembly.

FIG. 1 is a sectional view schematically illustrating a fuel cell 200 including a membrane electrode assembly 100 manufactured by a method of manufacturing a membrane electrode assembly (MEA) as a first embodiment of the present disclosure. The fuel cell 200 is a solid polymer electrolyte fuel cell that generates electricity by being supplied with hydrogen gas as a fuel gas and air as an oxidizing gas as reaction gases. The fuel cell 200 is formed by sandwiching the membrane electrode assembly 100 and a resin frame 80 between a cathode side separator 60 having an oxidizing gas flow path 62 and an anode side separator 70 having a fuel gas flow path 72. Although one fuel cell 200 is illustrated in FIG. 1, a plurality of fuel cells 200 may be stacked depending on a required output voltage.

The membrane electrode assembly 100 functions as an electrode membrane of the fuel cell 200. The membrane electrode assembly 100 includes a catalyst coated membrane (CCM) 20, a cathode side gas diffusion layer 30, and an anode side gas diffusion layer 40. The catalyst coated membrane 20 includes a flat plate-shaped electrolyte membrane 21, a cathode side electrode catalyst layer 22 disposed on the surface of the electrolyte membrane 21 corresponding to the cathode, and an anode side electrode catalyst layer 23 disposed on the surface of the electrolyte membrane 21 corresponding to the anode. The electrolyte membrane 21 is a proton-conductive ion-exchange resin membrane formed of an ionomer having a sulfonic acid group at the terminal group. As the electrolyte membrane 21, for example, a fluorine-based resin such as Nafion (registered trademark) is used. In the following description, in a case where the cathode side electrode catalyst layer 22 and the anode side electrode catalyst layer 23 are not distinguished from each other, the cathode side electrode catalyst layer 22 and the anode side electrode catalyst layer 23 are also referred to as "electrode catalyst layer 50".

The gas diffusion layers 30 and 40 are conductive members having gas diffusibility. As the gas diffusion layers 30 and 40, for example, carbon cloth or carbon paper formed of non-woven fabric is used. The cathode side gas diffusion layer 30 is disposed on the outer surface of the cathode side electrode catalyst layer 22, and the anode side gas diffusion layer 40 is disposed on the outer surface of the anode side electrode catalyst layer 23. The membrane electrode assembly 100 including the gas diffusion layers 30 and 40 is also called a "membrane electrode and gas diffusion layer assembly (MEGA)".

The cathode side gas diffusion layer 30 of the gas diffusion layers 30 and 40 contains a radical inhibiting substance. The radical inhibiting substance means a substance which is ionized and reacts with hydrogen peroxide or radicals to inactivate the radicals or suppress the generation of the radicals. As the radical inhibiting substance, for example, a cerium compound, a manganese compound, platinum, or a platinum alloy can be used. As the cerium compound, for example, cerium oxide, cerium nitrate, cerium acetate, cerium chloride, cerium sulfate, primary cerium phosphate, secondary cerium phosphate, cerium carbonate, or a complex of cerium and tungsten, zirconium, lanthanum, or the like can be used. As the manganese compound, for example, manganese oxide can be used. In the present embodiment, cerium oxide is contained in the cathode side gas diffusion layer 30. The radical inhibiting substance may be contained in the anode side gas diffusion layer 40.

In the fuel cell 200, when an electrochemical reaction progresses at the time of generating electricity, as well as water generated by a main reaction, hydrogen peroxide ($H_2O_2$) may be generated by a side reaction. Hydrogen peroxide may generate radicals such as hydroxy radicals. The radicals may decompose the main chain of the polymer electrolyte of the electrolyte membrane 21 and deteriorate the electrolyte membrane 21.

The radical inhibiting substance (cerium oxide in the present embodiment) contained in the cathode side gas diffusion layer 30 is ionized by being decomposed by sulfate ions ($SO_4^{2-}$) or by being dissolved in liquid water present in or near the cathode side gas diffusion layer 30, and flows into the electrolyte membrane 21. The ionized radical inhibiting substance (cerium ion in the present embodiment) reacts with hydrogen peroxide or radicals in the electrolyte membrane 21 to inactivate the radicals or suppress the generation of radicals, thereby suppressing the deterioration of the electrolyte membrane 21 caused by the radicals.

As illustrated in FIG. 1, the resin frame 80 is a flat plate-shaped frame body and seals the space between the separators 60 and 70. As the resin frame 80, a resin such as PE, PP, PET, or PEN can be used. The resin frame 80 has an opening for disposing the membrane electrode assembly 100 at the center in the plane direction. The resin frame 80 and the membrane electrode assembly 100 are adhered to each other by an adhesive 82. The adhesive 82 is a UV (ultraviolet)-curable or thermosetting adhesive, and for example, an adhesive containing polyisobutylene or butyl rubber can be used.

In the present embodiment, the adhesive 82 further contains an ionization accelerator. The ionization accelerator means a substance that accelerates the decomposition of a sulfonic acid group of an ionomer contained in the electrode catalyst layer 50 and the sulfonic acid group of the electrolyte membrane 21 to increase the amount of sulfate ions generated. The ionization accelerator contains, for example, a low molecular weight component represented by a chemical formula $C_lH_mO_n$. In the chemical formula $C_lH_mO_n$, l, m, and n are natural numbers of 1 or more, and 1 is a natural number of 12 or less. It is more preferable that the ionization accelerator contains a low molecular weight component represented by chemical formulas $C_4H_6O_4$, $C_9H_{10}O_4$, $C_9H_{12}O_4$, and $C_{10}H_{12}O_4$, which has a high reactivity with a sulfonic acid group and easily adjusts the amount of sulfate ions generated.

In a case where the amount of sulfate ions in the membrane electrode assembly 100 is small, ionization of the radical inhibiting substance does not proceed, and hydrogen peroxide and radicals are not sufficiently rendered harmless. Therefore, the deterioration of the electrolyte membrane 21 due to radicals cannot be suppressed, and the performance of the electrolyte membrane 21 can be reduced. In the present embodiment, the adhesive 82 containing the ionization accelerator is applied to the outer peripheral portion of the membrane electrode assembly 100 to increase the amount of sulfate ions generated in the outer peripheral portion of the membrane electrode assembly 100. The amount of sulfate ions generated may be adjusted by the amount of the low molecular weight component contained in the adhesive 82.

Figure 2:
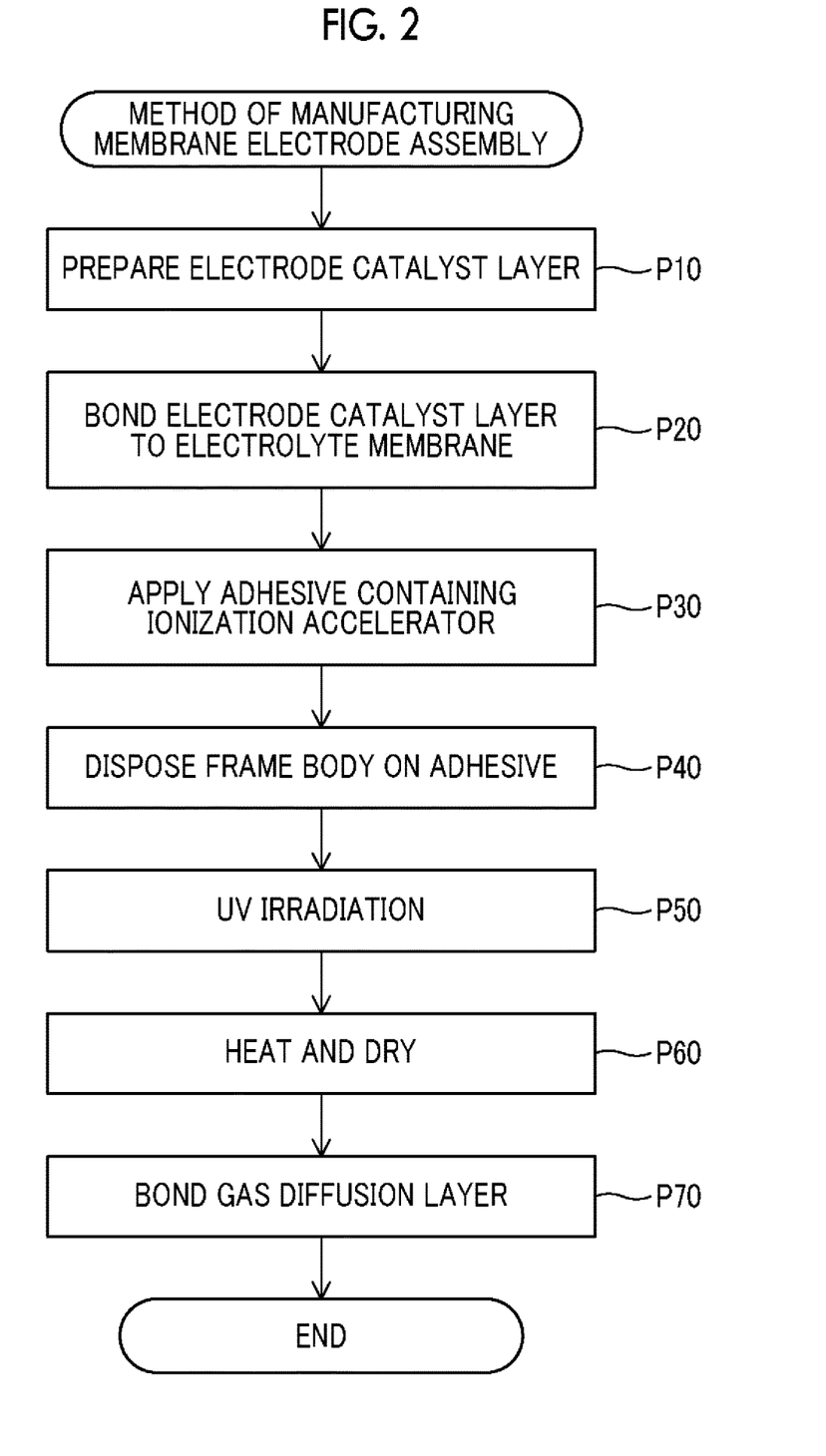
FIG. 2 is a manufacturing step diagram showing a method of manufacturing a membrane electrode assembly.

FIG. 2 is a manufacturing step diagram showing a method of manufacturing the membrane electrode assembly 100 of the present embodiment. The electrode catalyst layer 50 is formed using an electrode catalyst (step P10). The electrode catalyst is primarily formed of a catalyst carrier carrying catalyst particles and an ionomer. As the catalyst carrier, for example, various carbon particles or carbon powders such as carbon black and carbon nanotubes may be used. As the catalyst particles, for example, in addition to platinum, a platinum compound such as a platinum cobalt alloy or a platinum nickel alloy may be used. The ionomer is a proton-conductive electrolyte material having a sulfonic acid group at the terminal group. As the ionomer, for example, a fluorine-based resin such as Nafion (registered trademark) is used.

Figure 3:
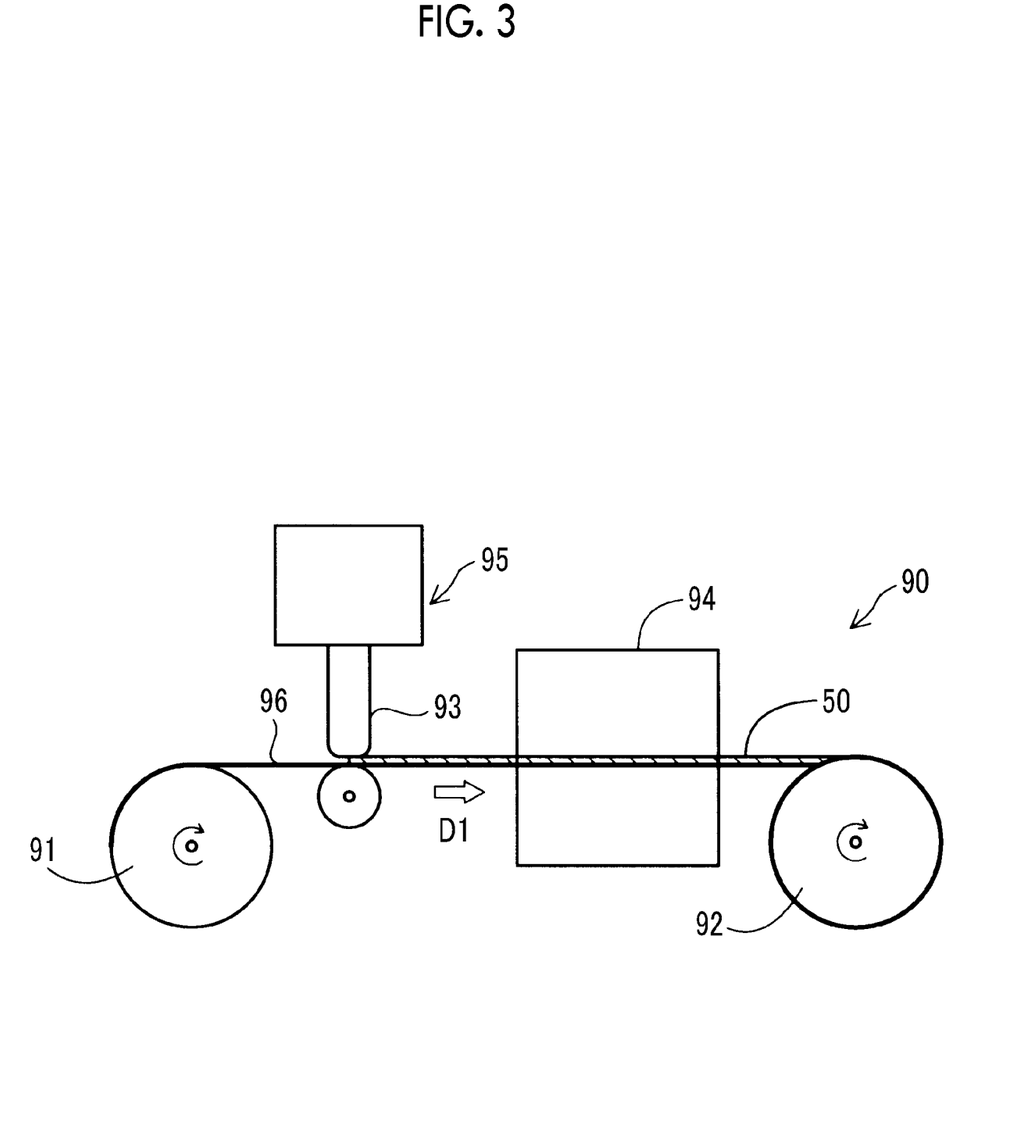
FIG. 3 is an explanatory view schematically illustrating the configuration of a catalyst layer manufacturing apparatus.

FIG. 3 is an explanatory view schematically illustrating the configuration of a catalyst layer manufacturing apparatus 90 for manufacturing the electrode catalyst layer 50. The catalyst layer manufacturing apparatus 90 applies an ink-like electrode catalyst (hereinafter, also referred to as "catalyst ink") to the surface of a sheet-like base material 96 and dries the electrode catalyst, thereby forming the electrode catalyst layer 50. For example, the catalyst ink can be produced by mixing the catalyst carrier particles mixed with ion-exchanged water, a solvent, and the ionomer, and dispersing the mixture by using an ultrasonic homogenizer, a bead mill, or the like. The catalyst layer manufacturing apparatus 90 includes a sending-out roll 91 around which the sheet-like base material 96 is wound, a winding roll 92, a drying furnace 94, and a coating machine 95.

The sending-out roll 91 and the winding roll 92 are each rotated by a motor (not illustrated). The base material 96 is sent out by the rotation of the sending-out roll 91, is transported in a transport direction D1, and is wound by the winding roll 92. Instead of the base material 96, the sheet-like electrolyte membrane 21 may be used.

A die head 93 is a part of the coating machine 95, and is disposed so as to face the surface of the base material 96. The die head 93 extrudes the catalyst ink accommodated in the coating machine 95 to coat the surface of the base material 96. The drying furnace 94 heats and dries the catalyst ink. As the drying furnace 94, various in-line type or batch type drying furnaces using an electric heater, a steam heater, infrared rays, or the like can be used. In the present embodiment, drying conditions are set to a temperature of 150 degrees and a time of 60 minutes, but may be appropriately set according to the kind of solvent contained in the catalyst ink and the like. The catalyst ink applied to the base material 96 is dried by the drying furnace 94 and formed as the electrode catalyst layer 50 on the base material 96. The electrode catalyst layer 50 is wound together with the base material 96 by the winding roll 92, such that the preparation of the electrode catalyst layer 50 is completed.

Figure 4:
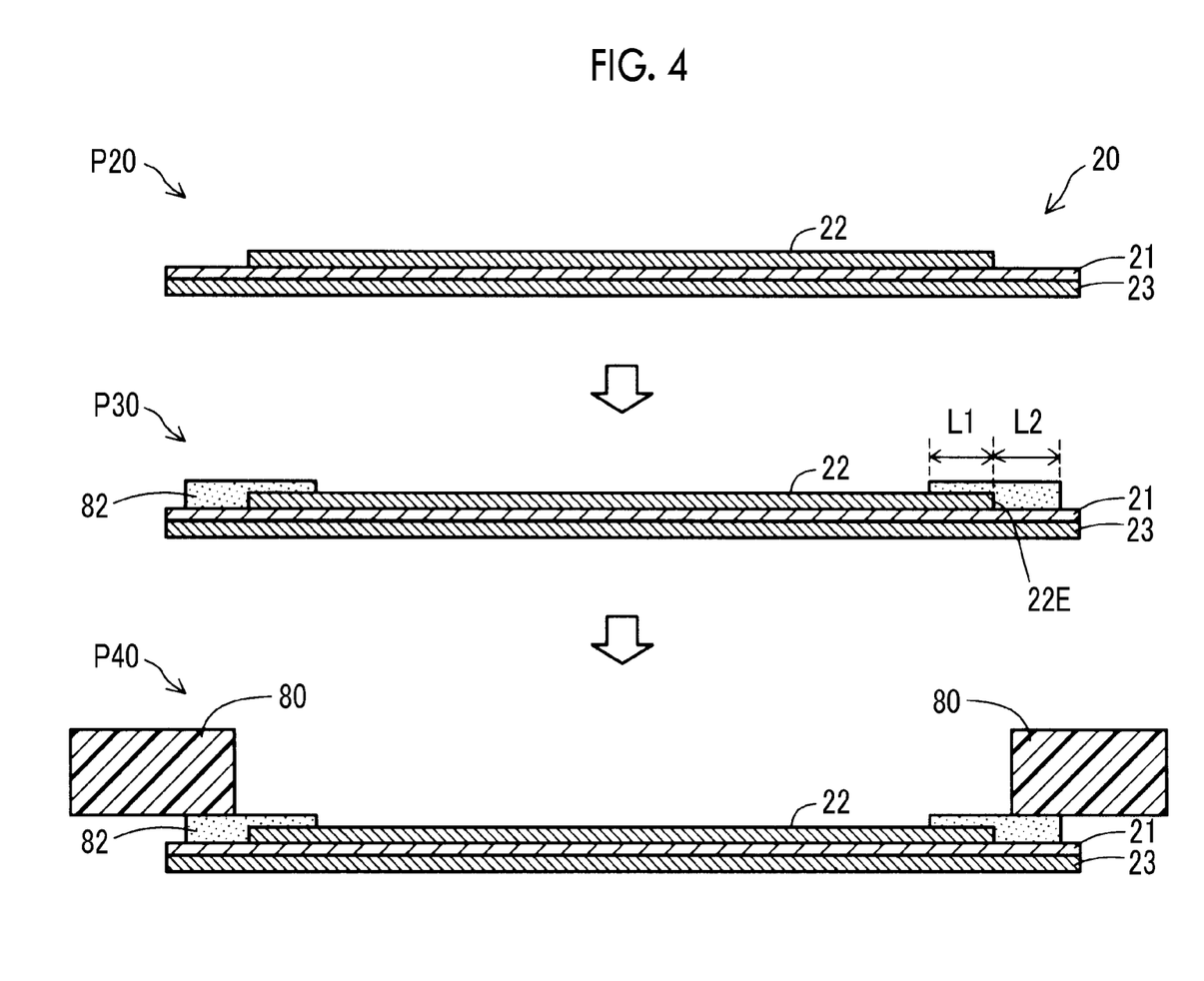
FIG. 4 is a first explanatory view illustrating the method of manufacturing a membrane electrode assembly.

FIG. 4 is a first explanatory view illustrating the method of manufacturing the membrane electrode assembly 100 of the present embodiment. As illustrated in the upper side of FIG. 4, the electrode catalyst layers 50 are bonded to both surfaces of the electrolyte membrane 21 (step P20). For example, hot pressing is used to bond the electrolyte membrane 21 and the electrode catalyst layers 50. The electrode catalyst layers 50 cut out into a sheet shape are disposed on the respective surfaces of the electrolyte membrane 21 and subjected to hot pressing. The electrode catalyst layer 50 corresponding to the cathode side is cut out so that the external shape thereof is smaller than that of the electrode catalyst layer 50 corresponding to the anode side. The cathode side electrode catalyst layer 22 is bonded to one surface of the electrolyte membrane 21 and the anode side electrode catalyst layer 23 is bonded to the other surface thereof by hot pressing, whereby the catalyst coated membrane 20 is formed.

As illustrated in the center of FIG. 4, the adhesive 82 containing the ionization accelerator is applied to the catalyst coated membrane 20 (step P30). A region to which the adhesive 82 is applied is a region where the resin frame 80 is to be adhered to the catalyst coated membrane 20, and is the outer peripheral portion of the catalyst coated membrane 20 in the present embodiment. More specifically, the region to which the adhesive 82 is applied is a region including a region on the cathode side electrode catalyst layer 22 extending from an end portion 22E on the outer peripheral side of the cathode side electrode catalyst layer 22 toward the center side in the plane direction by a predetermined distance L1, and a region on the electrolyte membrane 21 extending from the end portion 22E toward the outside by a predetermined distance L2. The adhesive 82 may be applied by various methods such as screen printing. The region to which the adhesive 82 is applied may be appropriately changed so as to correspond to the shape of the resin frame 80. The region to which the adhesive 82 is applied includes the adhering region between the resin frame 80 and the catalyst coated membrane 20, and may be a region wider than the adhering region.

As illustrated in the lower side of FIG. 4, the resin frame 80 is disposed on the application range of the adhesive 82 in a state where the catalyst coated membrane 20 is positioned in the center opening thereof (step P40). UV irradiation is performed on the laminate obtained in step P40 (step P50). UV irradiation may be performed by a general UV irradiation device. The curing of the adhesive 82 proceeds by UV irradiation. The laminate obtained in step P50 is heated and dried (step P60). For heating and drying, various in-line type or batch type drying furnaces using an electric heater, a steam heater, infrared rays, or the like can be used. In step P60, a drying temperature is preferably a temperature higher than 100 degrees in order to sufficiently cure the adhesive 82. The drying temperature of the adhesive 82 containing the ionization accelerator is more preferably a temperature higher than the glass transition point (Tg) of the ionomer contained in the electrode catalyst layer 50 in order to accelerate the decomposition of the sulfonic acid group of the ionomer by the ionization accelerator. In the present embodiment, the drying temperature is set to 140 degrees higher than the glass transition point of the ionomer. In the present embodiment, a drying time is set to 60 minutes, but may be set to 80 minutes, 120 minutes, or the like as appropriate depending on the composition of the adhesive 82 and the required amount of sulfate ions to be generated. The adhesive 82 is thermally cured by the heating and drying, and the resin frame 80 is fixed onto the catalyst coated membrane 20. A layer of the material containing the ionization accelerator is also referred to as an "ionization accelerator layer". In the present embodiment, the ionization accelerator layer is a layer of the adhesive 82 after the UV curing and the heating and drying.

Figure 5:
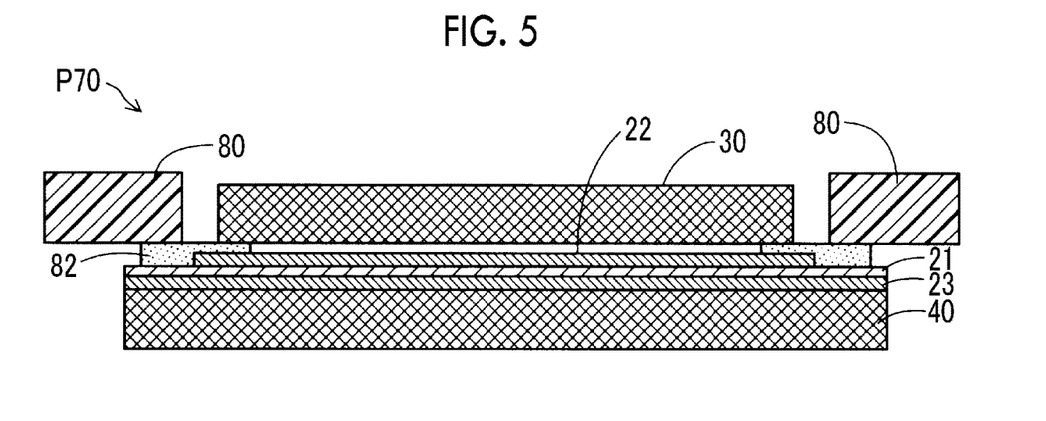
FIG. 5 is a second explanatory view illustrating the method of manufacturing a membrane electrode assembly.

FIG. 5 is a second explanatory view illustrating the method of manufacturing the membrane electrode assembly 100. As illustrated in FIG. 5, the gas diffusion layers 30 and 40 are bonded to the laminate obtained in step P60 (step P70). The cathode side gas diffusion layer 30 is disposed on the surface of the catalyst coated membrane 20 corresponding to the cathode side in the opening of the resin frame 80, and the anode side gas diffusion layer 40 is disposed on the surface of the catalyst coated membrane 20 corresponding to the anode side. The laminate in which the gas diffusion layers 30 and 40 are disposed is subjected to hot pressing, whereby the membrane electrode assembly 100 is completed in which the cathode side gas diffusion layer 30 is bonded onto the surface of the cathode side electrode catalyst layer 22, the anode side gas diffusion layer 40 is bonded onto the surface of the anode side electrode catalyst layer 23 of the catalyst coated membrane 20, and the resin frame 80 is included. In the present embodiment, the cathode side gas diffusion layer 30 is bonded onto the outer surfaces of the layer of the adhesive 82 which is the ionization accelerator layer and the cathode side electrode catalyst layer 22 of the catalyst coated membrane 20. The cathode side gas diffusion layer 30 may be bonded only onto the outer surface of the cathode side electrode catalyst layer 22. Regarding the disposition of the anode side gas diffusion layer 40, the anode side gas diffusion layer 40 may be bonded to the outer surface of at least one of the ionization accelerator layer or the anode side electrode catalyst layer 23, similarly to the cathode side gas diffusion layer 30. The anode side gas diffusion layer 40 may be bonded to the anode side electrode catalyst layer 23 in a step prior to step P40.

Figure 6:
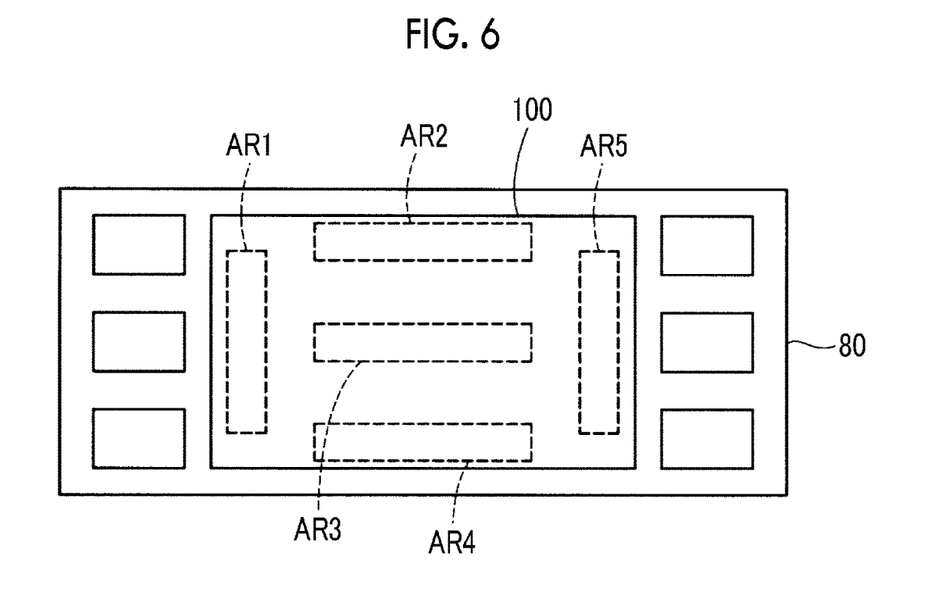
FIG. 6 is an explanatory view schematically illustrating a membrane electrode assembly obtained by the method of manufacturing a membrane electrode assembly according to the present embodiment.
Figure 7:
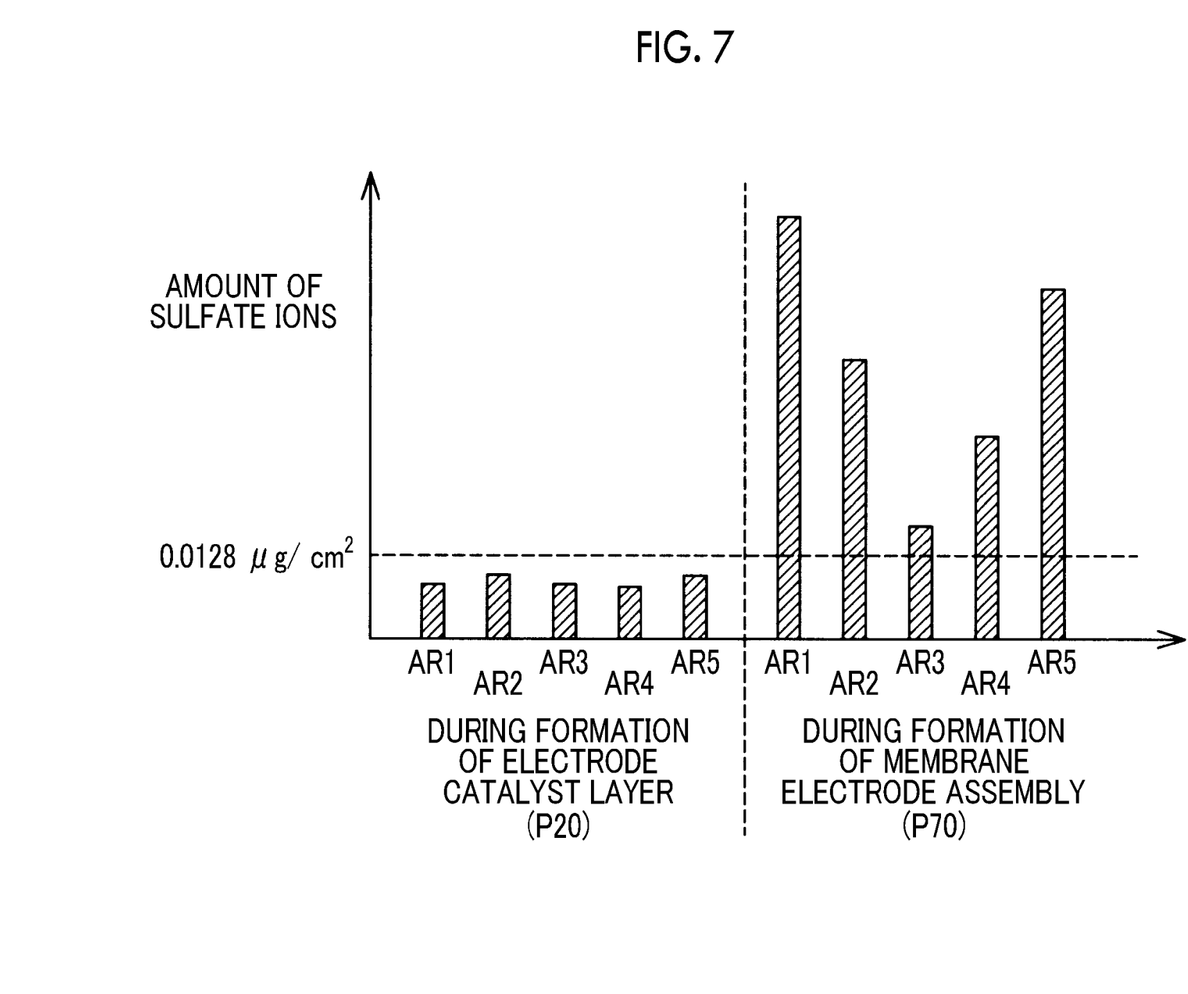
FIG. 7 is an explanatory view illustrating the amount of sulfate ions measured for each of a plurality of regions of the membrane electrode assembly.

The amount of sulfate ions contained in the membrane electrode assembly 100 obtained by the method of manufacturing the membrane electrode assembly 100 of the present embodiment will be described with reference to FIGS. 6 and 7. FIG. 6 is an explanatory view schematically illustrating the membrane electrode assembly 100 obtained by the method of manufacturing the membrane electrode assembly 100 of the present embodiment. FIG. 6 illustrates the cathode side surface of the membrane electrode assembly 100 in a state of being fixed to the resin frame 80. FIG. 7 is an explanatory view illustrating the amount of sulfate ions measured for each of a plurality of regions of the membrane electrode assembly 100. An analyzer such as an ion chromatograph can be used to measure the amount of sulfate ions. In the present embodiment, the amount of sulfate ions is measured by immersing in warm water a sample piece produced by transferring the membrane electrode assembly 100 onto a transfer sheet, and subjecting an extract thus obtained to ion chromatography. FIG. 7 illustrates the amounts of sulfate ions measured in five regions including regions AR1 to AR4 that are the outer peripheral portion of the membrane electrode assembly 100 illustrated in FIG. 6 and a region AR5 that is the center of the membrane electrode assembly 100. The regions AR1 to AR4 are regions included in the application region of the adhesive 82.

As illustrated in FIG. 7, the amount of sulfate ions in the electrode catalyst layer 50 formed in step P20 is less than 0.0128 $\mu g/cm^2$, while the amount of sulfate ions in each of the regions AR1 to AR5 in the membrane electrode assembly 100 formed in step P70 is 0.0128 $\mu g/cm^2$ or more. When the amount of sulfate ions is less than 0.0128 $\mu g/cm^2$, ionization of the radical inhibiting substance does not proceed, and hydrogen peroxide and radicals are not sufficiently rendered harmless. In the membrane electrode assembly 100 formed in the step P70, the amount of sulfate ions in the outer peripheral portion from the region AR1 to the region AR4 is larger than the amount of sulfate ions in the region AR5 which is the center. That is, this means that the amount of sulfate ions generated in the outer peripheral portion of the membrane electrode assembly 100 is increased by applying the adhesive 82 having the ionization accelerator to the outer peripheral portion of the membrane electrode assembly 100.

As described above, according to the method of manufacturing the membrane electrode assembly 100 of the present embodiment, since the ionization accelerator containing the low molecular weight component represented by the chemical formula $C_lH_mO_n$ is applied to the catalyst coated membrane 20, the sulfonic acid group of the ionomer contained in the electrode catalyst layer 50 can be decomposed to increase the amount of sulfate ions. Therefore, the ionization of the radical inhibiting substance contained in the cathode side gas diffusion layer 30 can be accelerated. Therefore, inactivation of radicals in the electrolyte membrane 21 and inhibition of the generation of radicals can be accelerated, and deterioration of the electrolyte membrane 21 due to the radicals can be suppressed.

According to the method of manufacturing the membrane electrode assembly 100 of the present embodiment, the adhesive 82 for bonding the membrane electrode assembly 100 to the resin frame 80 is used as the ionization accelerator. It is not necessary to individually apply only the ionization accelerator to the catalyst coated membrane 20, a step can be omitted, so that the productivity of the membrane electrode assembly 100 can be improved.

According to the method of manufacturing the membrane electrode assembly 100 of the present embodiment, the amount of sulfate ions contained in the catalyst coated membrane is 0.0128 $\mu g/cm^2$ or more. Therefore, the ionization of the radical inhibiting substance can be accelerated to sufficiently suppress the deterioration of the electrolyte membrane 21.

According to the method of manufacturing the membrane electrode assembly 100 of the present embodiment, the temperature for heating and drying the adhesive 82 is set to a temperature higher than the glass transition point of the ionomer in the electrode catalyst layer 50. Therefore, it is possible to further accelerate the decomposition of the sulfonic acid group of the ionomer by the ionization accelerator.

B. Other Embodiments (B1) In the above-described embodiment, the adhesive 82 containing the ionization accelerator is applied to the outer peripheral portion of the catalyst coated membrane 20. Contrary to this, the adhesive 82 containing the ionization accelerator may be applied not only to the outer peripheral portion of the catalyst coated membrane 20 but also to the center thereof. The ionization accelerator may not be contained in the adhesive 82 and may be directly applied to the catalyst coated membrane 20. The ionization accelerator directly applied to the catalyst coated membrane 20 forms the ionization accelerator layer through the UV irradiation in step P50 described above and the heating and drying in step P60. According to the method of manufacturing the membrane electrode assembly 100 of this aspect, the amount of sulfate ions in any range including the outer peripheral portion and the center of the membrane electrode assembly 100 can be increased.

(B2) In the above-described embodiment, an example is described in which the amount of sulfate ions in each of the regions AR1 to AR5 in the membrane electrode assembly 100 formed in step P70 is 0.0128 $\mu g/cm^2$ or more. Contrary to this, the amount of sulfate ions contained in the catalyst coated membrane 20 may be less than 0.0128 $\mu g/cm^2$, for example, by a method of reducing the amount of the ionization accelerator.

(B3) In the above-described embodiment, the drying temperature in step P60 is set to 140 degrees, which is higher than the glass transition point of the ionomer contained in the electrode catalyst layer 50, but the heating and drying temperature may be a temperature lower than the glass transition point of the ionomer.

The present disclosure is not limited to the above-described embodiments, and can be realized in various configurations without departing from the gist thereof. For example, the technical features of the embodiments corresponding to the technical features in each of the aspects described in SUMMARY can be appropriately replaced or combined in order to solve some or all of the above-described problems or achieve some or all of the above-described effects. In addition, when the technical features are not described as essential in the present specification, the technical features can be appropriately deleted.

What is claimed is:

1. A method of manufacturing a membrane electrode assembly, the method comprising:

forming a catalyst coated membrane using an electrode catalyst layer containing an ionomer having a sulfonic acid group and a catalyst carrier, and an electrolyte membrane;

applying an ionization accelerator having a low molecular weight component represented by a chemical formula $C_l H_m O_n$ where l, m, and n are natural numbers for accelerating generation of sulfate ions, to the catalyst coated membrane;

performing UV irradiation on the ionization accelerator applied to the catalyst coated membrane;

heating the catalyst coated membrane having the ionization accelerator subjected to the UV irradiation; and bonding a gas diffusion layer containing a radical inhibiting substance to an outer surface of at least one of the ionization accelerator subjected to the UV irradiation or the catalyst coated membrane.

2. The method according to claim 1, wherein the ionization accelerator is contained in an adhesive for bonding the membrane electrode assembly to a frame body.

3. The method according to claim 1, wherein an amount of the sulfate ions contained in the catalyst coated membrane is 0.0128 μg/cm$^2$ or more.

4. The method according to claim 1, wherein a temperature for the heating is a temperature higher than a glass transition point of the ionomer.

* * * * *